(12) United States Patent
Cordero et al.

(10) Patent No.: US 7,839,937 B2
(45) Date of Patent: Nov. 23, 2010

(54) METHOD AND CIRCUITRY FOR PROCESSING DATA

(75) Inventors: Rodrigo Cordero, Bristol (GB); Patrice Woodward, Fishponds Bristol (GB)

(73) Assignee: STMicroelectronics Limited, Almondsbury Bristol (GB)

( * ) Notice: Subject to any disclaimer, the term of this patent is extended or adjusted under 35 U.S.C. 154(b) by 528 days.

(21) Appl. No.: 10/167,044

(22) Filed: Jun. 11, 2002

(65) Prior Publication Data

US 2002/0186775 A1    Dec. 12, 2002

(30) Foreign Application Priority Data

Jun. 11, 2001  (EP) ................... 01305084
Nov. 13, 2001  (EP) ................... 01309585

(51) Int. Cl.
*H04B 1/66* (2006.01)
(52) U.S. Cl. ................................. 375/240.29
(58) Field of Classification Search ..............
375/240.25–240.29; 382/238, 240, 165;
370/392, 542, 535, 465, 477, 516, 526, 360,
370/474; 709/236; H04B 1/66
See application file for complete search history.

(56) References Cited

U.S. PATENT DOCUMENTS

| | | | | |
|---|---|---|---|---|
| 5,841,874 A * | 11/1998 | Kempke et al. | ............. | 713/160 |
| 5,966,385 A * | 10/1999 | Fujii et al. | ................... | 370/465 |
| 6,252,872 B1 * | 6/2001 | Tzeng | ......................... | 370/360 |
| 6,377,998 B2 * | 4/2002 | Noll et al. | ................... | 709/236 |
| 6,459,814 B1 * | 10/2002 | Li et al. | ...................... | 382/240 |
| 6,477,185 B1 * | 11/2002 | Komi et al. | .................. | 370/536 |
| 6,556,708 B1 * | 4/2003 | Christian et al. | ............ | 382/165 |
| 6,650,710 B1 * | 11/2003 | Hamery et al. | ......... | 375/240.29 |
| 6,680,952 B1 * | 1/2004 | Berg et al. | ................... | 370/467 |
| 6,683,958 B2 * | 1/2004 | Petrovic | ..................... | 380/238 |
| 6,781,601 B2 * | 8/2004 | Cheung | ...................... | 345/629 |
| 6,948,186 B1 * | 9/2005 | Brosey | ....................... | 725/151 |
| 7,013,482 B1 * | 3/2006 | Krumel | ...................... | 726/13 |
| 7,133,400 B1 * | 11/2006 | Henderson et al. | .......... | 370/389 |
| 7,369,554 B1 * | 5/2008 | Modelski et al. | ............ | 370/392 |
| 2001/0002907 A1 * | 6/2001 | Jeong et al. | ................. | 370/392 |
| 2002/0015426 A1 * | 2/2002 | Kim | .......................... | 370/542 |
| 2003/0076856 A1 * | 4/2003 | Cordero et al. | ............ | 370/465 |
| 2004/0004977 A1 * | 1/2004 | Robbins et al. | ............. | 370/535 |

(Continued)

FOREIGN PATENT DOCUMENTS

EP    0197356 A    5/1999

(Continued)

OTHER PUBLICATIONS

European Search Report from European patent application No. 01309585.6 which claims priority to European patent application No. 01305084.4.

(Continued)

*Primary Examiner*—Tung Vo
(74) *Attorney, Agent, or Firm*—Lisa K. Jorgenson; James H. Morris; Wolf, Greenfield & Sacks, P.C.

(57) ABSTRACT

Circuitry for processing data includes a plurality of filters arranged in parallel. Input data is stored. The input data is applied to the plurality of filters to provide at least two parallel results. An operation is carried out with respect to the results.

19 Claims, 7 Drawing Sheets

U.S. PATENT DOCUMENTS

2005/0008039 A1* 1/2005 Funaya et al. ............... 370/474

FOREIGN PATENT DOCUMENTS

| EP | 0 939 546 A | 9/1999 |
| EP | 0939546 A | 9/1999 |
| GB | 234309 A | 8/2000 |
| WO | WO 0108374 A | 2/2001 |
| WO | WO 0103546 A | 5/2001 |

OTHER PUBLICATIONS

Co-pending U.S. Appl. No. 10/167,242, filed Jun. 11, 2002.
European Search Report from European patent application 01305084.4, filed Jun. 11, 2001.

* cited by examiner

METHOD AND CIRCUITRY FOR PROCESSING DATA

FIELD OF THE INVENTION

The present invention relates to a method and circuitry for processing data and in particular, but riot exclusively to a method and circuitry for processing data in a receiver which receives a data stream.

BACKGROUND OF THE INVENTION

In digital television systems, the television is provided with a set top box to receive and decode a broadcast digital data stream which contains program information art for display on the television. The broadcast digital data stream may arise at the set top box via a satellite or cable system, via a digital terrestrial system, or via disk or tape. A disk or tape, such as a CD ROM in a personal computer, may provide digital video information for display on the monitor.

There are various known standards for digital video broadcasting (DVB) and one now commonly used standard is the MPEG-2 standard.

In the MPEG-2 DVB standard, data is encoded into transport packets. Each transport packet is defined by the standard as consisting of 188 bytes, comprising four header bytes and 184 payload bytes ("the data payload"). For transmission, the transport packets are time division multiplexed into a transport stream. At the receiver in the set top box, the transport stream is demultiplexed to recover the transport packets. Optionally, the transport packets may be scrambled and encoded with error correction information for transmission and then descrambled and error checked at the receiver. The data payload in the transport packets is, according to the MPEG-2 standard, one of two types. The first type is known is a packetised elementary stream (PES), and the second type is known as program specific information (PSI).

The packetised elementary streams (PESs) form the video, audio and private data information of the broadcast. A PES packet may contain all sorts of data, audio or video and also other information such as teletext or other user defined general data. The MPEG-2 transport stream is made up of one or more PESs (either video, audio or private). The MPEG-2 transport stream is primarily intended for this transport of TV programs over long distances. This type of stream can combine, in the same multiplex, many programs, each of them being composed of one or more PESs. In order that the receiver can cope with this mix of program information, the MPEG-2 standard defines all types of tables, which together make up the MPEG-2 program specific information (PSI).

Each table of the PSI is made up of one or more sections, there being a maximum of 256 sections for each table. The MPEG-2 tables are defined in the standard, and include a program allocation table, a program map table, a conditional access table and private tables. The European DVB standard additionally defines complementary service information tables. The basic service information tables are the network information table, service description table, event information table, and time and date table. The optional service information tables are the bouquet association tables, running status tables, and stuffing tables. Each section includes an optional cyclic redundancy code (CRC) check.

A PES packet always starts at the beginning of the payload part of the transport packet and ends at the end of the transport packet. Sections, however, do not necessarily start at the beginning nor finish at the end of the transport packet. For a section, the transport packet can start with the end of another section.

At each decoder or set top box, the transport, stream is decoded. To achieve the decoding of the transport stream, each set top box is provided with a transport interface, which provides an input interface between the transport stream input to the box and the actual MPEG-2 decoders which decode the audio and video information and sections broadcast. The transport interface demultiplexes the transport stream to retain only those transport packets, which are required lay the particular set top box for decoding. The transport stream is a set of different services time division multiplexed and the purpose of the transport interface is to demultiplex them. At a front input end of the transport interface, a time demultiplex function is performed to separate the transport stream into its component transport packets.

Each transport packet has associated therewith in its header a packet identifier (PID) which identifies the type of packet and various information associated with the data in the packets including the type of packet (PES or PSI). Each particular receiver or set top box is only interested in receiving packets having packet identifiers of interest to the particular set top box, for instance those associated with the particular television program selected for viewing. Thus, once the incoming transport stream has been time demultiplexed to recover the transport packets, it is necessary to further demultiplex the transport packets to retain only those having packet identifiers required by the receiver.

The transport interface merely uses the header of PES transport packets to demultiplex them, and stores the data payload of the demultiplexed packets in the memory. The transport interface similarly demultiplexes PSI transport packets but then filters the sections of the demultiplexed packets to retain only sections required by the receiver, before storing the filtered sections in the memory without further processing.

In order that the receiver can cope with this mix of program information, the MPEG-2 standard defines all types of tables, which together make up the MPEG-2 program specific information (PSI).

The transport interface performs, at the receiver, a number of demultiplexing operations. As stated hereinabove, initially the transport interface time demultiplexes a received transport stream. The data packets extracted from the time demultiplexed transport stream are then demultiplexed so as to retain only those data packets required by the particular receiver. These data packets may be audio or video information (IEPESs) or sections (IEPSI). Even though a data packet containing sections is demultiplexed by the receiver to be retained, it is possible that the information provided by the section is not required by the receiver. For instance the section may be associated with the table that is not of interest to the receiver, the sections may be associated with tables that have already been processed by the receiver, the sections may be versions of tables that have already been processed, or the sections may be associated with information relating to a specific set top box address which does not match the current set top box address, for example entitlement messages (ie ECM, EMM entitlement control message, entitlement management message).

It is therefore generally desirable to provide a further level of demultiplexing in the receiver so as to discard those sections of no interest to the receiver. In one known technique, the MPEG sections are filtered at the bit level. This is a slow process. Additionally, the number of filters which need to be checked are large and may for example be 32, 48 or 64 filters.

There are additional checks which need to be implemented occasionally and the filtering can vary from broadcast to broadcast. These are done in the known implementation by CPU software processing, which is slow.

In particular, search engines are used in the known arrangements. This is slow due to the fact that the data has to be ordered and treated with complex algorithms. Furthermore, the known arrangements are not particularly flexible.

SUMMARY OF THE INVENTION

Accordingly, it is an aim of embodiments of the present invention to which address the problems described hereinbefore.

According to a first aspect of the present invention there is provided circuitry for processing data, said circuitry comprising a plurality of filters arranged in parallel, means for storing input data, said input data being applied to said plurality of filters to provide at least two parallel results, and means for carrying out an operation with respect to said results.

According to a second aspect of the present invention there is provided a method for processing data comprising applying input data to a plurality of filters in parallel to provide at least two parallel results, carrying out an operation with respect to said results.

BRIEF DESCRIPTION OF THE DRAWINGS

For a better understanding of the present invention and as to how the same may be carried into effect, reference will now be made by way of example to the accompanying drawings in which.

DETAILED DESCRIPTION OF THE INVENTION

In the following description the present invention is described with reference to an exemplary embodiment in which an MPEG-2 transport stream is demultiplexed in a programmable transport interface of a receiver in a digital set top box. It will be apparent, however, that the present invention is not limited to such an application and does in fact have broader applicability to other types of digital data and other types of application for example ATM address filtering, Ethernet address filtering or the like. Embodiments of the invention are particularly advantageous where high performance and real time processing is required.

Figure 1:
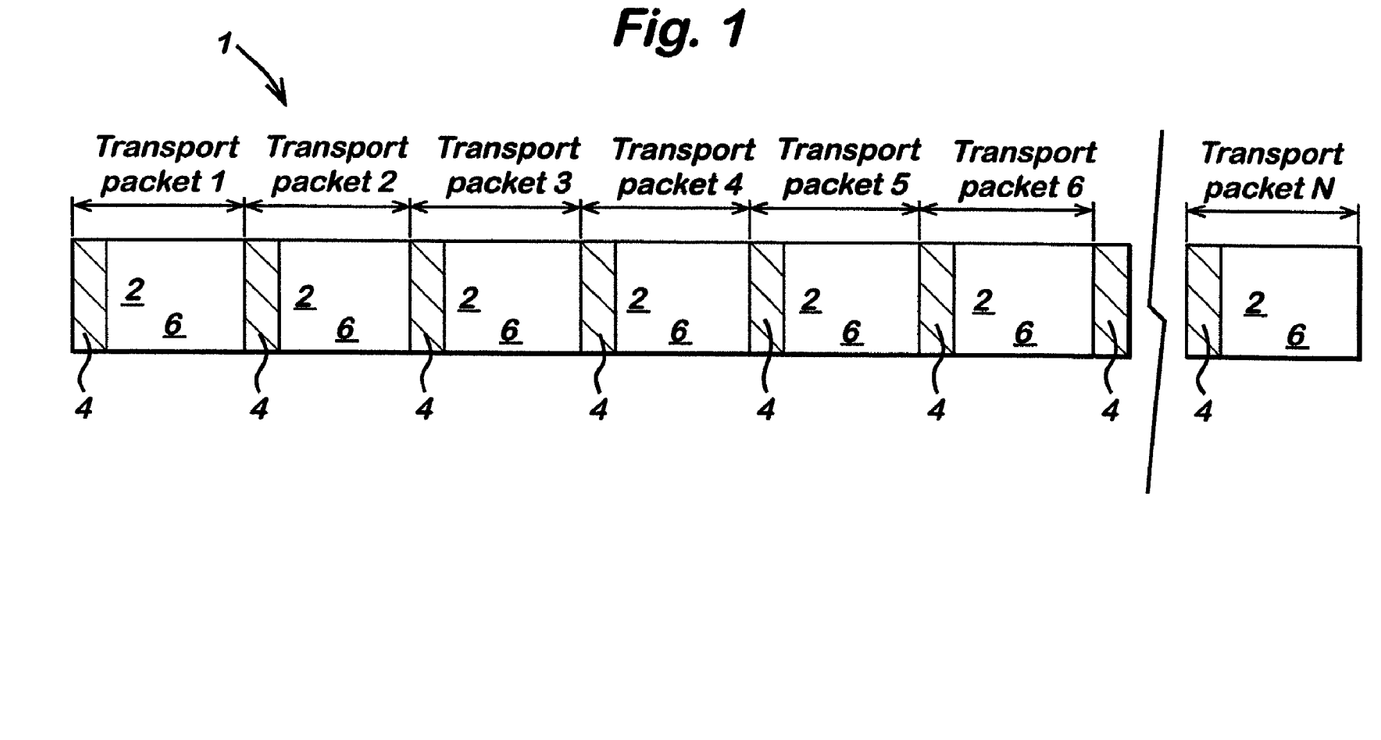
FIG. 1 illustrates a portion of the transport stream.

FIG. 1 illustrates a portion of a transport stream 1 which is composed of a series of n transport packets 2. Each transport packet 2 comprises a transport packet header 4 and a transport packet payload 6. The transport stream is a bit stream which carries in the transport packet payloads 6 information for recreating, for example, a number of different television programs. The transport stream is a stream of digital data.

The transport stream is formed by source encoding the television programs. The transport stream is then typically channel encoded for transmission (by satellite or cable) and channel decoded on its reception to reproduce the transport stream. The transport stream is then source decoded to recreate a selected one of the different television programs. Each particular television program requires three types of information (audio information, video information and tables of program information) for its recreation. Each transport packet 2 is preferably associated with a particular television program, a particular source encoding time and a particular one of the information types. The individual transport packets are time division multiplexed to form the transport stream and allow the real-time recreation of any one of the different television programs from the transport stream. To recreate a television program the transport stream is sequentially demultiplexed to recover only the transport payloads 6 of audio information, video information and tables of program information which are associated with the selected television program. The recovered payloads are then decoded and used to recreate the television program.

According to the MPEG-2 digital video broadcast (DVB) standard, each of the transport packets 2 is 188 bytes long and the transport packet header 4 is four bytes long. The transport packet payload 6 contains either audio or video information or sections. The sections are parts of tables. The audio and video information and the sections in the payloads 6 are packetised and encoded in accordance with MPEG-2 DVB compression standard.

Figure 2:
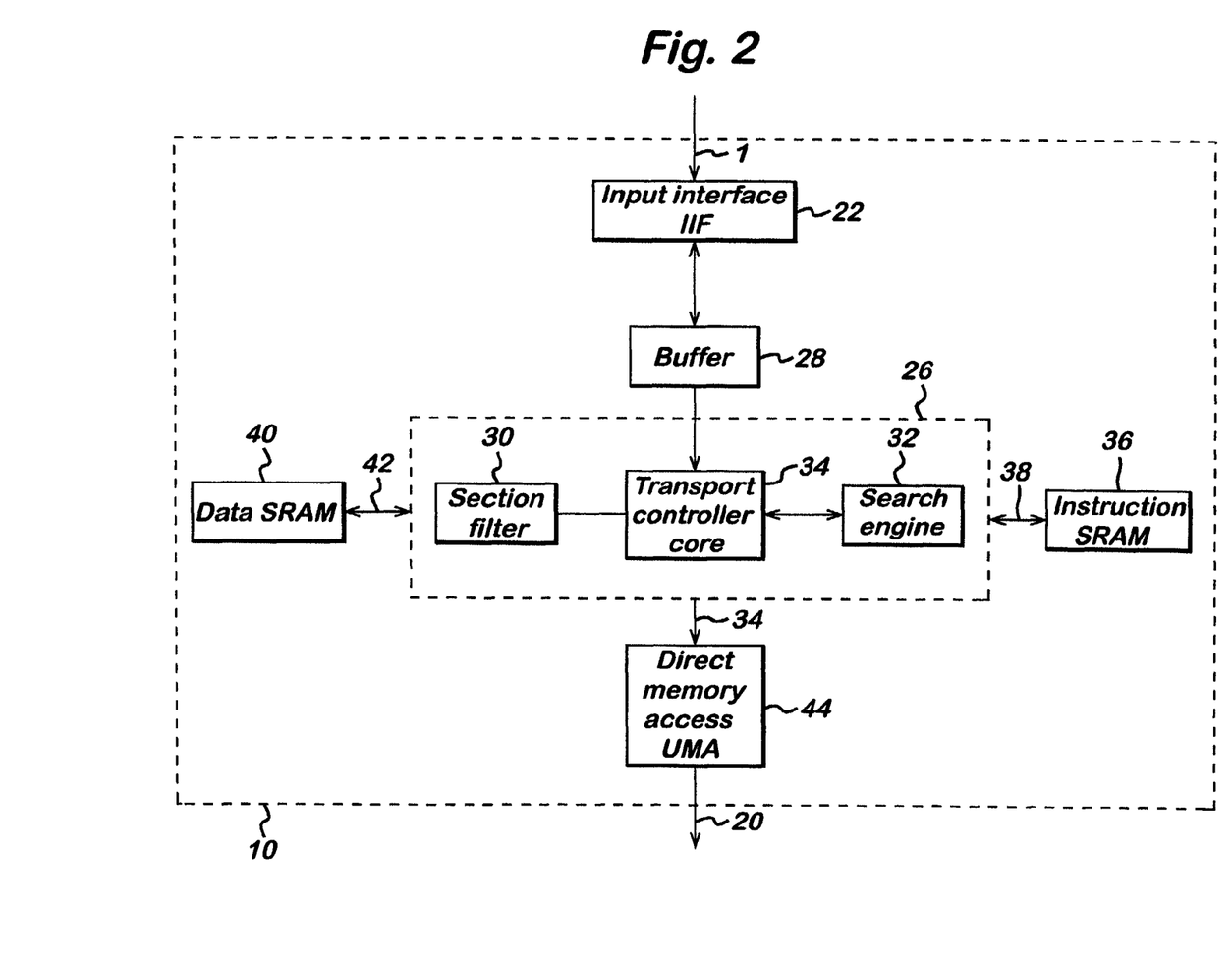
FIG. 2 illustrates in block schematic form a programmable transport interface.

Reference is made to FIG. 2 which shows a programmable transport interface. This interface is used to process a transport stream 1 and produce a data output stream suitable for reconstitution as a television program after MPEG-2 decoding by MPEG-2 decoders (not shown). The programmable transport interface 10 is included in a receiver which receives the transport stream 1.

The transport packet header contains a synchronisation byte which identifies the beginning of each transport packet 2. The transport packet header also contains a packet identifier (PID) which identifies the information type and the television program associated with the transport packet payload 6. The transport packet 2 also contains information identifying the source encoding time of the transport packet. The transport packet header 4, including the synchronisation byte and the PID, is not scrambled. The transport packet payloads 6 may be scrambled.

The programmable transport interface (PTI) 10 performs various functions including:

1. Using the synchronisation byte to identify the start of the transport packet 2;
2. Using the packet identification (PID) to identify, amongst other functions, the type of information contained in the packet (i.e. audio or video information or sections) and the television program it represents;
3. Descrambling the transport packet payload 6; and
4. Demultiplexing the transport stream 1 to produce a data output stream 20.

The data output stream 20 comprises a stream of audio information associated with the selected television program, a stream of video information associated with the selected television program or tables of program information associated with the selected television program. The PTI outputs the streams to the necessary MPEG-2 decoder to reproduce the selected television program.

The programmable transport interface 10 comprises an input interface. The input interface 22 receives the transport stream 1. The input interface 22 identifies the synchronisation byte of each transport packet which is used to synchronise the system clock and the transport stream. The input interface 22 is controlled by the transport core 24 of a transport controller 26 via input interface control signals from the transport controller core to the input interface. The control signals may include a descrambling control signal and output stream control signals.

The input interface 22 provides bits to the transport controller 26 via a buffer 28. The buffer 28 is used to temporarily store data from the input interface, when required. The input interface 22, under the control of the transport controller core 24 descramble the payload 6 of selected transport packets and supplies selected descrambled payloads to the transport controller 26.

The transport controller 26 comprises a section filter 30 and search engine 32 in addition to the transport controller core 24. The transport controller 26 operates on the bits received from the input interface 22. In particular, the transport controller 26 receives from the input interface 22 the transport packet header 4 of the transport packet 2 arriving at the input interface 22. The transport controller 26 uses the packet identifier in the transport packet header 4 to determine whether the transport packet 2 now entering the input interface is associated with the selected television program for the programmable transport interface 10. If it is not, the received transport packet 2 is discarded If it is, it controls the, input interface 22 to descramble, if necessary, the transport packet payload as described above:, and to supply the transport packet payload 6 to the transport controller 26.

The transport controller 26 may pass a payload 6 associated with the audio or video information for the selected program straight to the transport controller output 34. If the payload relates to a section of a table the transport controller may further process the information before providing it at its output 34.

The transport controller core 24 of the transport controller 26 reads instruction sets from an instruction SRAM 36. The transport controller 26 is connected to the SRAM 36 by interconnect 38 and it reads its instructions via that interconnect. A system processor (not shown) may read and write to the instruction SRAM 36. However, the transport controller 26 has preferential access to the instruction SRAM 36 determined by an arbiter (not shown) which arbitrates between accesses by the transport controller 26 and the system processor.

The PTI 10 also comprises a data SRAM 40 which again can be accessed by the transport controller core 24. In particular, data is written to and read from the data SRAM 40 via interconnect 42. The search engine 32 is in the transport controller 26 is also able to read data from the data SRAM 40. The search engine 32 searches the data SRAM 40 for the packet identifiers in the incoming transport packet header 4. If the packet is not to be discarded, then the PID for that packet will have been stored in the data SRAM and is located by the search engine 32 of the transport controller 24. Associated with each packet identifier in the data SRAM 40 is a plurality of pointers, which point to other addresses in the data SRAM where other information associated with the incoming transport is stared.

The search engine retrieves the pointer stored with a particular packet identifier used by the transport controller core 24. The transport controller core 24 then uses the points to access all the information it needs to process the payload of the incoming transport packet. The pointers may, for example, point to descramble keys for use by the input interface 22, point to addresses for use by a direct memory access controller 44, identify whether the payload is video or audio information or sections, or identify whether the payload is special data to be output on an alternative output etc. Thus, the information obtained from the data SRAM 40 enables the transport controller to control the PTI 10.

The transport controller 26 produces the transport controller output 34 which is supplied to a multi channel direct memory access controller 44. The multi channel direct memory access controller 44 supplies the data output stream 20, indirectly, to the MPEG decoders (not shown).

Figure 3:
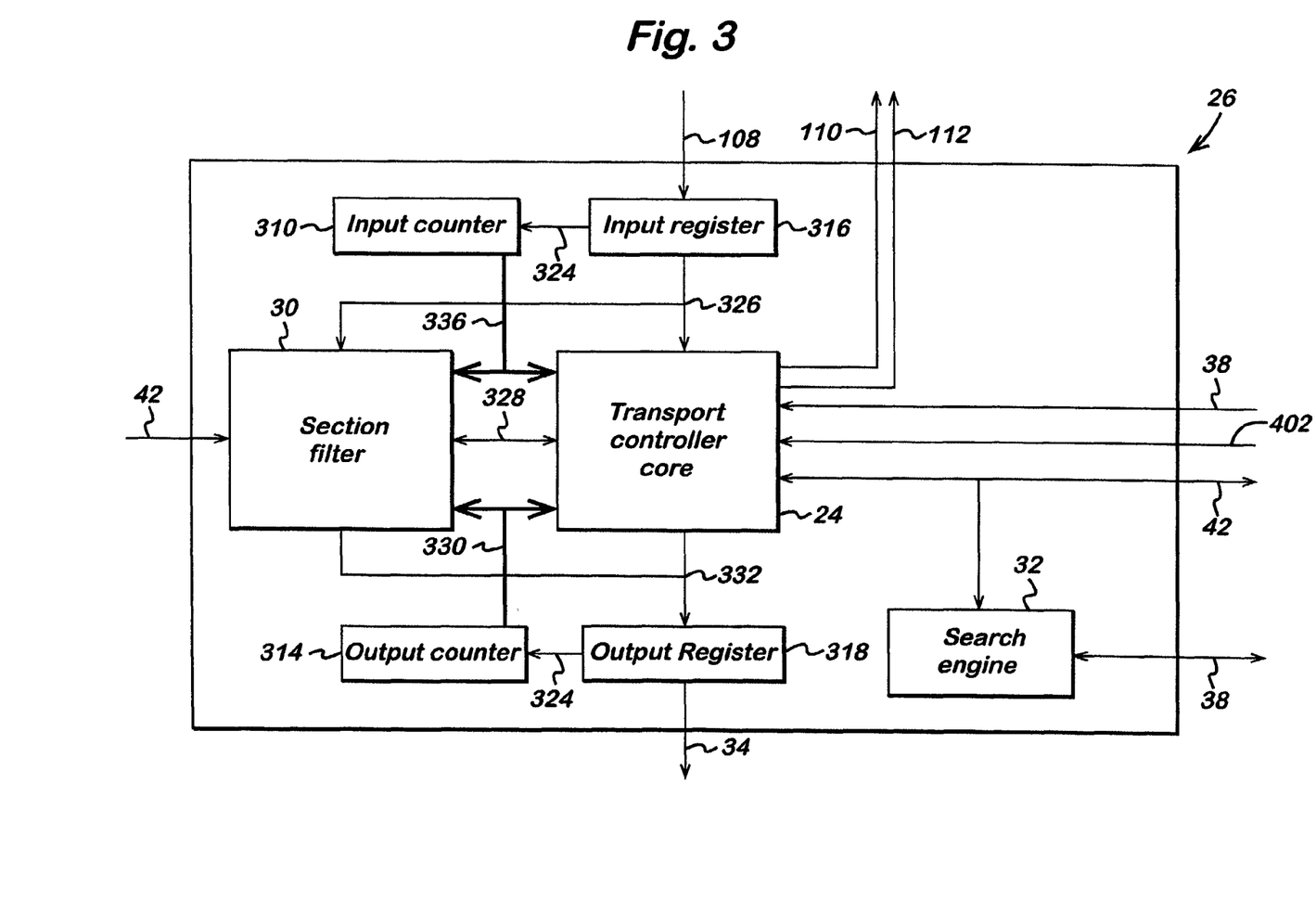
FIG. 3 shows the transport controller of the programmable transport interlace of FIG. 2 in more detail.

Referring now to FIG. 3, there is shown a block diagram of the main components of the transport controller which are the transport controller core 24, the section filter 30, an input register 316, an output register 318, an input counter 310, an output counter 314 and the search engine 32.

The input register 316 receives the bits on the interconnect 108 and presents them on lines 326 to both the transport controller core 24 and the section filter 30. Only one of the transport controller core 24 and the section filter 30 is able to grant the request from the input register. This is negotiated between the transport controller core and the section filter. The input register 316 also provides an input on line 324 to the input counter 310, and in turn the input counter 310 provides an input on line 336 to the transport controller core 24 and the section filter 30. The transport controller core 24 has bi-directional connections 328 to the section filter 30. As previously described, the transport controller core 24 is connected to the instruction SRAM 36 via the interconnect 38 and is connected to the system processor via the system interconnect bus 402. The transport controller core 24 also accesses the data SRAM via interconnections 42, the interconnections 42 also being connected to the search engine 32. The search engine 32 accesses the data SRAM via interconnection 38. The transport controller core provides an output on lines 332 which form an input to the output register 318, the output register 318 providing the output signals on interconnect 34. The output register 318 also provides a signal on line 334 which provides an input to the output counter 314. The output counter 314 in turn provides an output on signal line 330 to the transport controller core 24 and the section filter 30. The section filter 30 also has an output connected to line 332 to form an input to the output register 318. The section filter 30 can be accessed the system processor via the system interconnect bus 402. The transport controller core 24 also outputs signals 112 and the signal 110 directly to the input interface 22.

The transport controller core 34 receives the transport header of the transport packet and the packet identity contained therein is used to demultiplex the incoming transport stream and access information associated with that PID contained in the data SRAM 40. The transport controller core 24 supplies the PID of the incoming transport header to the search engine 32 and the search engine 32 communicates with the data SRAM 40 via the bus 406 to search the data SRAM for the given PID. If the PID is not present in the data SRAM then the transport controller core 24 discards the transport packet. If the PID is present in the data SRAM 40, then the transport controller core 24 accesses an address in the data SRAM 40 identified by the search engine 32 and obtains parameters associated with that PID therefrom.

The information accessed from the data SRAM in dependence on the PID will, amongst other parameters, identify whether the transport packets includes a section or whether it includes audio or video information. Embodiments of the present invention are concerned with the case where the incoming transport packet contains a section. If the incoming transport packet contains a section, then this section will need to be filtered to determine whether it is a section for use by the selected television program which is to be output by the transport controller.

Figure 4A:
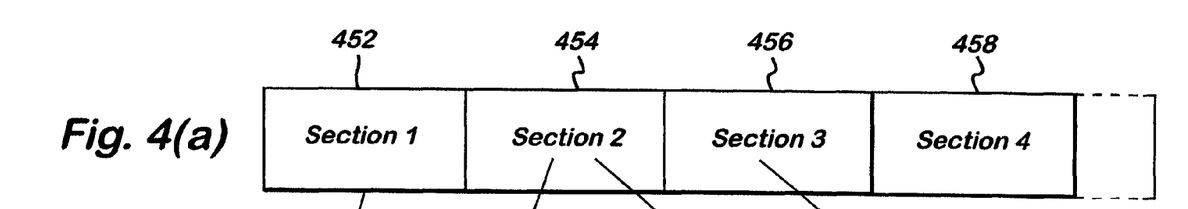
FIG. 4 illustrates the transport of sections in an MPEG-2 transport stream.
Figure 4B:
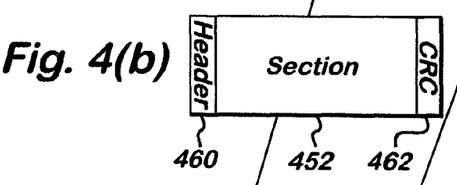

Reference will now be made to FIG. 4a, which shows a table comprising a plurality of sections 452 to 458, section 1 to section 4, prior to encoding for digital transmission. The table may comprise a much larger number of sections. For transmission in the transport stream, each section 452 to 458 is modified as shown in FIG. 4b. FIG. 4 b shows section 1, 452 modified to include a header 460 and a cyclic redundancy code (CRC) check sum for 62. After encoding as shown in FIG. 4(b), each section of the table is multiplexed into the, transport stream. Section: do not usually fit exactly into transport packets but are broken across transport packet boundaries into split sections.

It should be noted that the cyclic redundancy code check on the sections is optional.

Figure 4C:
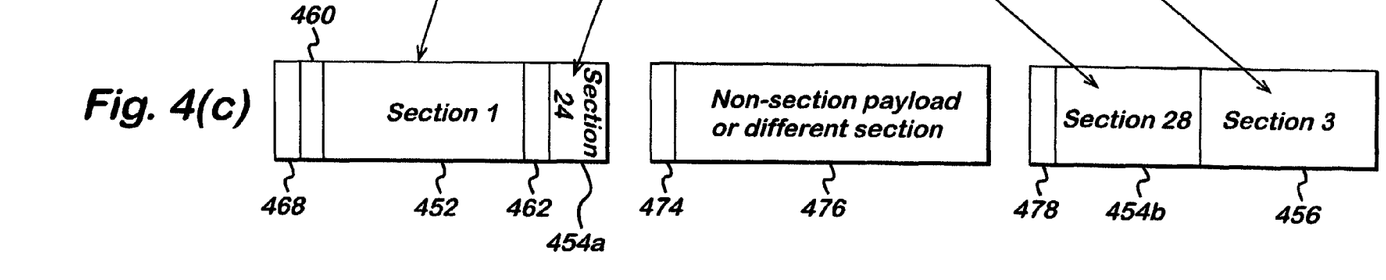

Referring to FIG. 4c, there is an example of a transport stream. The first transport packet comprises a packet header 468 and section 1450 having section header 460 and section CRC 462. The first transport packet additionally includes a first part of section 2, 454a. The next transport packet of the transport stream includes a transport packet header 474 and a transport packet payload 476. However, the payload 476 is the second transport packet and not section payload i.e. video or audio information. Alternatively, the payload 476 may include sections associated with the different table other than that of FIG. 4a. Thereafter a third transport packet and the transport stream having a packet header 478 includes a second part of section 2, 452b of the table of FIG. 4a and section 3, 454 of the table of FIG. 4a. By way of example only, the first and third transport packets of FIG. 4c are shown transporting the second and third sections of the table without any cyclic redundancy code check.

The transport steam received at the input interface 22 is that shown in FIG. 4c. The PID of each transport packet is part of the transport controller core 24 and for a packet having a valid PID in a section contained therein, the transport controller core 24 will access information from the data SRAM indicating that the payload is a section. Thus, the transport controller core 24 controls at least the start of the section filtering of the section in the incoming transport packet.

Section filtering is preferably applied over a fixed or variable number of bytes at the start of the section. Multiple filters can be applied to one section or multiple sections applied to one filter or a set of filters. The PID, used by the transport controller core 24 to access information associated therewith determines the type of filtering to be done on the section in accordance with control information stored in the data SRAM 40. In general, any bit of the section filter is normally a match value or a "don't care" value i.e. always matches. Some other options may also be useful, for example the option to pass the section through the section filter even when the section filter does not detect a match.

The main purpose of section filtering is data rate reduction and specifically to reject information that is not of interest for further processing. In this way, the load on the main processor is reduced. Sections might be rejected by the section filter because they are associated with tables that are not of interest, the sections may be associated with tables that have already been processed, they may be versions of tables that have already been processed, or they may be associated with information related to a specific set top box address which does not match the current set top box address, for example entitlement messages.

Figure 5:
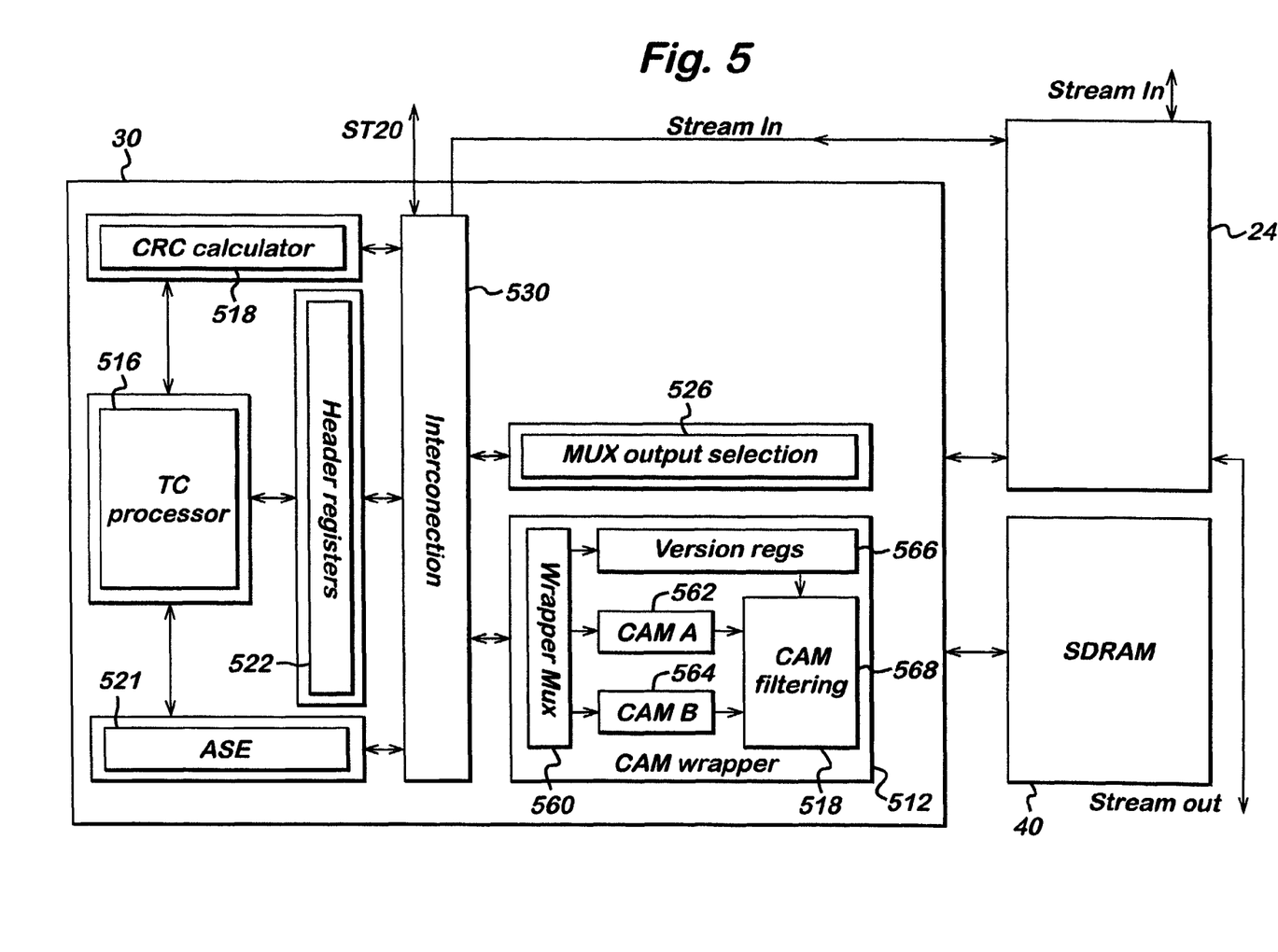
FIG. 5 illustrates a block diagram of a preferred implementation of a section filter according to the present invention.

Referring now to FIG. 5, the operation of the section filter 30 will now be described. The section filter 30 includes a content addressable memory (CAM) part 512, a CRC engine 518, an automatic search engine ASE 521, multiplexer output selector control 526 and registers 522. Each of these elements, which will be described in more detail hereinafter, are connected to an interconnect 530 which allows the elements in the section filter 30 to communicate. Additionally, the interconnect 530 is arranged to receive the data stream from the transport controller core 24 The interconnect 530 also allows data to be output to a system processor (not shown).

The section filter also has a state machine 516 which programs the section filter elements including the ASE 521 and the CAM block 512 controls routing for the transport controller. The state machine 516 is not connected directly to the interconnect 530 but is instead connected to the CRC engine 518, the automatic search engine ASE 521 and the registers 522.

The CAM block 512 is in preferred embodiments of the invention embedded in the section filter but in alternative embodiments may be external to the section filter.

The interconnect 530 is arranged to provide inputs to the CAM block 512 and receive outputs from the CAM block 512. The interconnect 530 allows the CAM block 512 to interface with the transport controller core 24 and the registers (in particular the header registers) 522 of the section filter 30. The interconnect 530 is also able to interface the CRC calculator 518 with the CAM block 512.

The registers 522 include a header register, a header count register, a section count register, a configuration register, a go register, a mismatch result register, a mask register, an operate register, a DMA start address register, a section state register, a section CRC register, an input count register and an output count register.

Each of the header registers, section count registers, DMA start register, section state register and section CRC register are connected to interconnect 530 which allows information in the registers to be accessed and/or updated. The registers are also connected to the state machine 516 which can provide control signals or information to the registers. The header register receives an input from state machine 516. In addition, the header register provides an output to the section count register. The section count register itself receives signals from the control logic.

The operate register receives control signals from the control logic as does each of the DMA staff address registers, the section state register, and the section CRC register. The section CRC register additionally receives signals from the CRC engine 518.

The header register includes the first n bytes of a section, and the number of the bytes of the header inputted. n is programmable and may be up to 18 bytes in one embodiment of the invention. The CRC register holds the state of the CRC. The DMA start register is used for CRC error recovery. The section count register counts down as section bytes are read and also contains the number of remaining bytes of a section. The section state register holds information relating to a split section and also holds the status in which the section filter stopped. The operate registers are arranged to configure the operation of the section filter, the filtering mode, breakpoints, CRC, section reporting mode and CAM result reporting mode.

The section filler also provides for error detection by provision of the CRC calculator or engine 518. The CRC engine 518 calculates the CRC of the transport packet being parsed including sections as it receives the transport packet. The CRC engine 518 keeps the current value of the CRC check stored in the section CRC register. When the end of a packet detected, the CRC engine 518 performs a check of the CRC of the received transport packet. The CRC engine 518 performs a check by comparing the CRC value it had itself calculated and stored in the section CRC register with the CRC check sum appended to the received section. If the CRC engine detects an error, then it is signals such.

The multiplexer output selection control 526 controls the output of the section filter and allows one of the following outputs to be selected. header; stream; results; or CRC output.

The ASE 521 is a state machine which controls the function of the section filters.

The CAM block 512 has a wrapper multiplexer which is arranged to receive headers from the header register. The wrapper multiplexer 560 is able to change the order of the bytes of the header is required. The operation provided by the wrapper multiplexer 560 is controlled by the state machine 516. The header bytes are output to a first CAM 562 and to a second CAM 564. These CAMs will be described in more detail hereinafter. The CAM block 512 also has a version register 566. A version register 566 checks that the data has not already been received. The data output by the wrapper multiplexer 560 is also input to the version register 566. The version register 566 and the first and second CAMs 562, 564 have an output connected to a CAM filtering arrangement 568 which will be described in more detail hereinafter.

Figure 6:
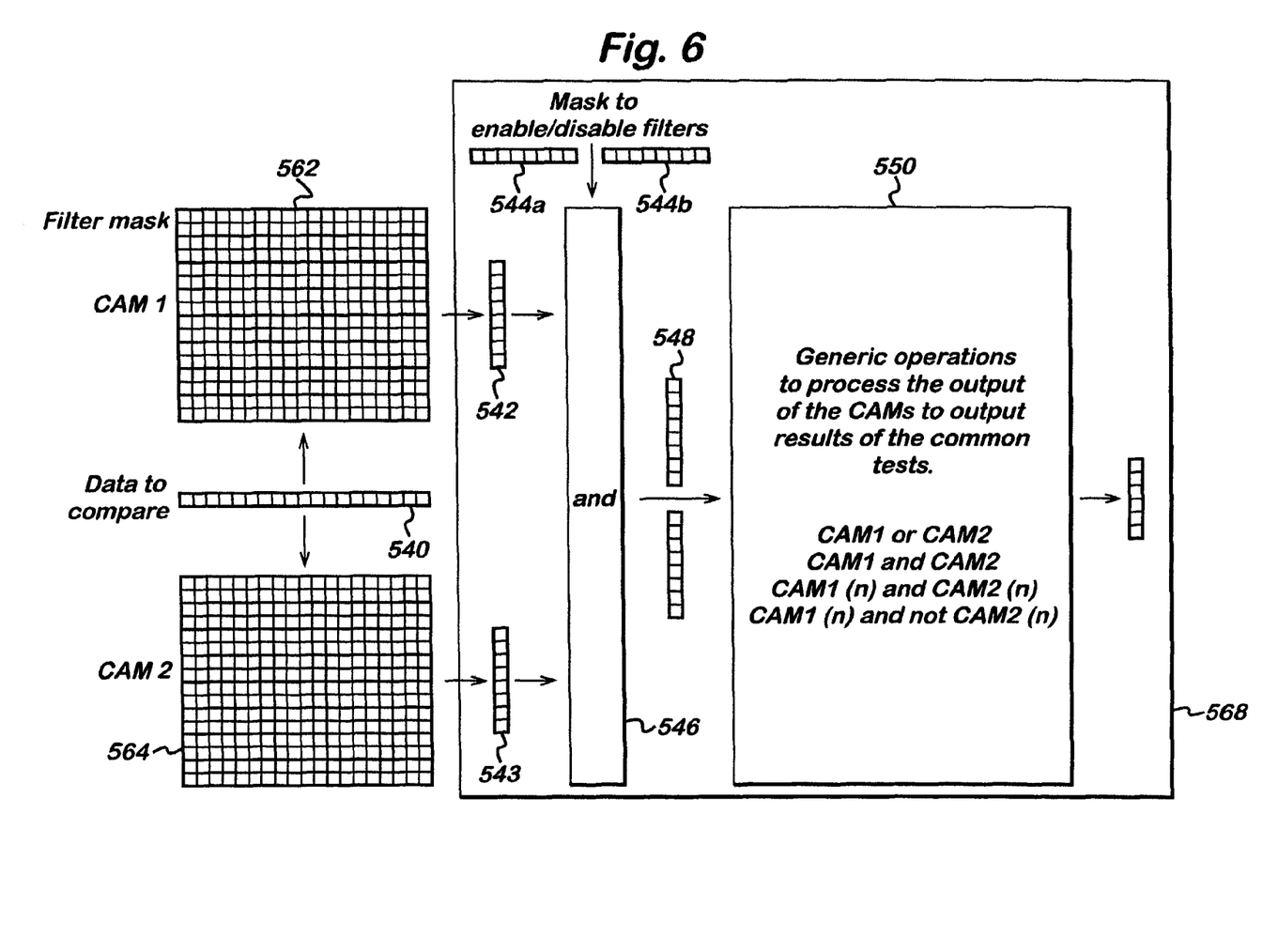
FIG. 6 illustrates part of the CAM block of FIG. 5 in more detail.
Figure 7:
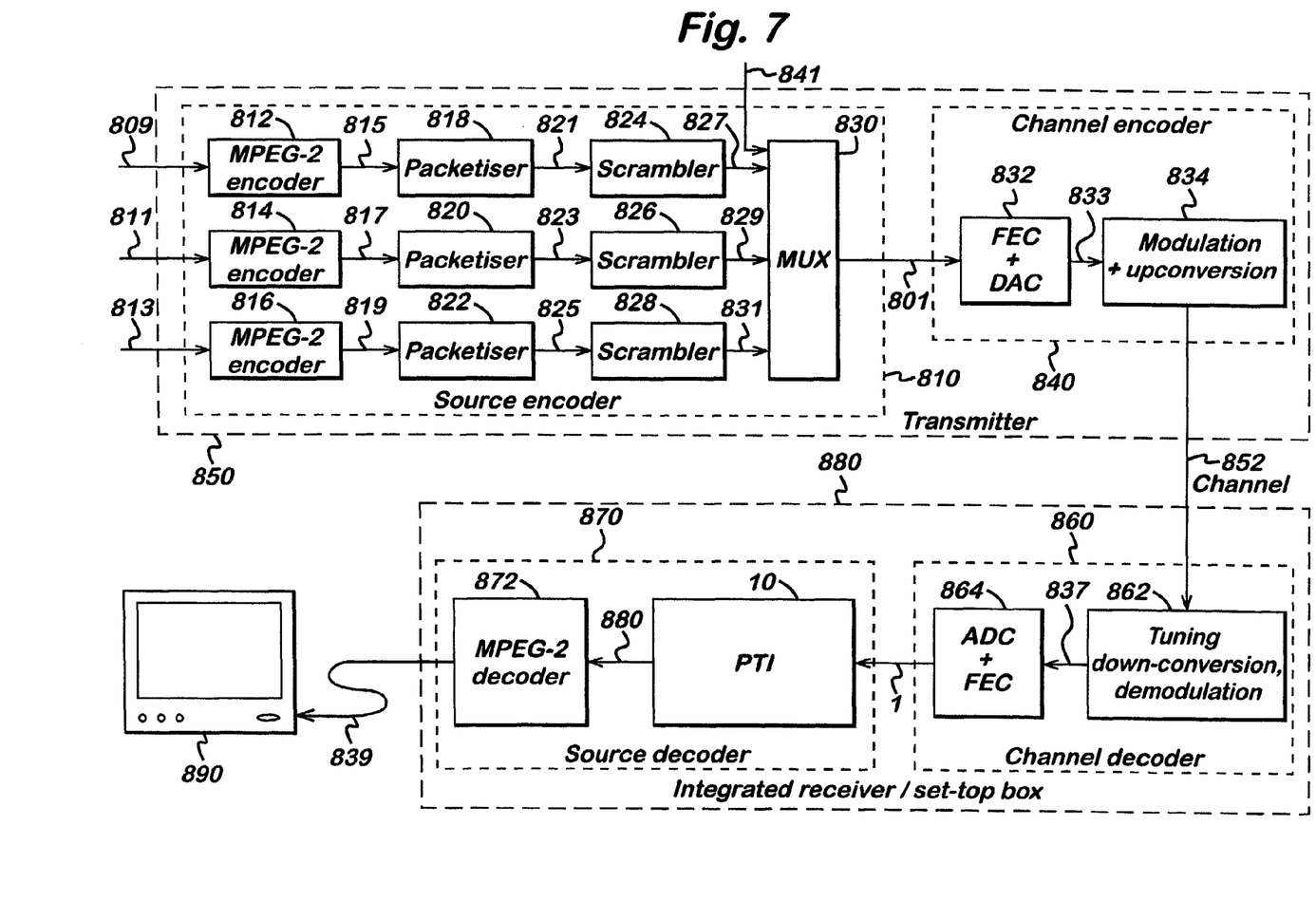
FIG. 7 shows a digital video broadcast system incorporation a programmable transport interface embodying the present invention.

Reference will now be made to FIG. 6 which shows part of the CAM block 512 of FIG. 5 in more detail. In particular, FIG. 6 shows the two CAMs and the filtering arrangement. In preferred embodiments of the invention the CAM block 512 is provided with a first CAM 562 and a second CAM 564. These CAMs may be different parts of the same CAM or separate CAMs. CAM 562 and CAM 564 store a plurality of filter values and associated with each filter value a mask. The filter values and the associated masks can be altered as required. The values stored in the CAMs are programmed in there by the state machine 516. The data output by the wrapper multiplexer 560 may be temporarily stored in a buffer or register 540. This register may be omitted in some embodiments of the invention. The input data is checked to see if it matches the filter value, taking into account the mask. In other words, a check is made to see if the input data matches the bits or bytes of the filter value which have not been masked. The result of that comparison is either pass or fail and thus provides a single bit output for that one comparison. In preferred embodiments of the present invention, a check is made between each filter value (and its mask) and the input data. The result of the comparison is thus a series of values indicating whether each comparison passed or failed. It should be appreciated that in preferred embodiments of the present invention, these Comparisons take place in parallel.

The results of that comparison with the values of the first CAM are stored in a first result register 542 or the like. The results of the comparison with values in the second CAM arm stored in a second result register 543. Those contents of the register are output to a masking arrangement 546 which if required can apply a separate mask 544a and b to each of the values from the result registers 542 and 543. The mask values can be programmed by, the state machine 516. The masking arrangement provides two results. The first result is the output of the first CAM 562, masked if necessary whilst the second result is the output of the second CAM 564, again masked as necessary. These results are input to a logic block 550 which is able to carry out functions in respect of the values. The logic block 550 can perform Boolean Functions or any other suitable logic functions.

The logic block 550 can be programmed to provide the required operations. Again the functions which are carried out by this block are controlled by the state machine 516. Whilst block 550 is described as preferably carrying out a logic function, it should be appreciated that in alternative embodiments of the invention, it is possible that block 550 be arranged to carry out other functions.

The logic block can perform the following functions;
  AND two results in their entirety or only one or more bits of each result
  OR the two results in their entirety or only one or more bits of each result
  XOR the two results in their entirety or only one or more bits of each result
  NAND the two results in their entirely or only one or more bits of each result Any one or both of the two results or the bit or bits in question of each result can be "NOT"ed.

For example:
  CAM 1 OR CAM 2
  CAM 1 AND CAM 2
  CAM 1($n$) AND CAM 2($n$)
  CAM 1($n$) AND NOT CAM 2($n$)
  where
  CAM 1 is the result from that CAM in its entirety
  CAM 2 is the result from that CAM in its entirety
  CAM 1($n$) is the nth bit of the result from the first CAM
  CAM 2($n$) is the nth bit of the result from the second CAM The result of the operations can indicate whether the header is of a required section.

The arrangement shown in FIG. 6 is flexible in that the filtering operation can easily be changed by programming and the logic operations can be changed as required.

e
Embodiments of the present invention are such that the filtering operation performed by the CAM block can be completed in a single clock cycle. Thus, the filtering can be achieved quickly. The arrangement is very flexible due at least in part to the use of the masks and the very simple calculator 550. The use of content addressing memories for section filtering is advantageous in that it is fast and provides a flexible solution. The MEPG stream can be stored or buffered and the result of the filtering can be obtained almost immediately. The generation of a small calculator 550 implements simple operations with respect to the output of the filters makes it very versatile. Masking the output of the CAM data as well as the filters themselves provides even more flexibility.

Referring to FIG. 4*c*, the transport stream illustrated therein arrives at the input interface 22, the: first transport packet of which includes a first section of a table. As already described, the PID of the incoming transport packet is used by the transport controller core 24 to access information associated with such PID stored in the data SRAM. The information retrieved from the data SRAM will indicate that the transport packet associated with such PID includes section information. The controller core thus connects the output of the input register directly to the input of the section filter 30. In doing so the transport controller core 320 requests the remainder of the payload of the incoming transport packet.

Prior to transferring the data payload of the transport packet in section, filter, there will be a request/grant handshake protocol between the section filter 30 and the input interface 22.

The operate register define whether or not there are any break points set and, if so which break points. In particular, the operate register has three bits. The first bit indicates that the first break point is set, the second bit indicates that the second break point is set and the third indicates if the third break point is set. It should be appreciated that in some modes of operation, none of the break points will be set. The bits in the operate register are set by the transport controller core 24. These operate registers which control the operation of the section filter. These configuration registers store masks which are to be applied to filter. Additionally these registers control the operations to be performed over the filters. Once the transport controller core has set the operate register, the header of the section in the incoming transport packet is loaded into the header register. The number of bytes in a header of a section may vary according to the application and furthermore in some applications it may not be necessary to load the whole header into the header register. If it is determined that what has been loaded is not a stuffing byte, is not an end of packet and is the end of header, then the next step will be the filtering step (which is carried out by the CAM block 512). The presence of a stuffing bit is determined, or the end of packet is determined or it is not the end of the header, then the next step is an idle step. If the end of packet is determined and the header is not finished, the system remains in the idle state until the header has been completed or there is valid packet. The system will alternatively stay in the idle state until a valid packet with no stuffing byte is provided. This may not be at an end of a packet.

In the filtering step the CAM block carries out the process discussed in relation FIG. 6. The results of the CAM operation are output. If the CAM block 512 finds the match of the mask header value then a hit signal is set. Otherwise the hit signal is not set.

The CAM interface block 512 outputs the result of the CAM operation and a value is loaded into the section state register to indicate whether the results of the CAM operation has found a match. Thus the section state register is indicative of whether the incoming section should be retained or discarded In the normal operation of the section filter, the next step would be the data payload of the section included in the incoming transport packet being transferred to the output of the section filter for transfer to the output without any further processing. Again, the section filter will implement a request/grant handshake protocol with the output register before outputting the data payload of the section.

However, the idle step will follow the filtering step if the first or second break points has been set. Break point 1 is defined as occurring just after the section filter has loaded the last byte of a header and performed the filtering. It occurs prior to any outputting of bytes for the current section. In the preferred embodiment of the present invention, break point 1 will occur if it is configured to happen and the section header is loaded and passes the filtering. The idle step effectively halts the filtering performed by the section filter so that the transport controller core (an perform its own processes in respect of the data. In particular, the transport controller core is able to access the section filter header registers and perform additional filtering schemes. As the transport control core is effectively a processor, these additional filtering schemes may be implemented after the manufacture of the chip so that changes in the standard may be accommodated. Once the filtering algorithm has been completed by the transport controller core, Idle transport controller core needs to signify whether the section is going to be accepted or rejected. For this, a value section filter wanted flag register is provided with one value of a bit indicating that the section is accepted and the other value of the bit indicating that the section is to be rejected. The wanted flag register is writable by the section fitter and the transport controller core. The transport controller core can stop the section filter, during a break point, to reinitialise or modify the wanted flag register. In one embodiment of the present invention, writing a one to this flag and setting a section filter go bit high will result in the section filter resuming operation by outputting the header and payload of the section to the output register.

The CRC may be checked and if the state machine or the ASE is configured to consider it, the state machine or ASE will inform the transport controller core that there is an error. This may or may not result in the removal of the already output data from the buffer. This may be dependent on the type of date. On the other hand, writing a zero to the flag and setting the section filter go bit will result in the section filter resuming operation by discarding the section header and payload. Effectively, that means that the process is started again and the next header is checked. It is possible that the bytes inside the header register can be modified by the transport controller core before they are output. The transport controller core can also decide to input the section payload byte by byte and modify it before it is output to the DMA. The correctly updated values need to be written to the section filter configuration registers before restarting for the next section. In other words the section length and state need to be updated to customise the operations over the filtering so that any filtering flavour or specific need can be performed by the PTI using the filtering hardware with very little overload for the transport controller.

In embodiments of the present invention, the breakpoints may be used to introduce indexing information in some of the sections or to modify some parts such as ECM and EMM.

In embodiments of the present invention, a second break point is also defined. Break point 2 is, similar to break point 1 except that it occurs regardless of the filtering output. It also takes place just after the section filter has loaded the last byte of the header and performed the filtering. It happens prior to any outputting of bytes for the, current section. If breakpoint 2 is configured to happen, the section header is loaded, regardless of the filtering result. Again, the transport controller can now access the section filter header registers and perform additional filtering schemes. Once the filtering algorithm is completed, the transport controller again needs to signify whether the section is going to be accepted or rejected by writing the appropriate value to the section filter wanted flag. Writing a one to this flag and setting the section filter go bit high will again result in the section filter resuming operation by outputting the header and the payload of the section to the register. Writing a zero to this flag and setting the section filter go bit will result in the section filter resuming operation by discarding the section headier and payload. As with breakpoint 1, the bytes inside the header registers can be modified by the transport controller before they are output. The transport controller can also decide to input to the section payload byte by byte and modify it before outputting it to the DMA. Again, the correctly updated values will need to be written to the section filter configuration register before restarting it or the next section.

In preferred embodiments of the present invention, the data goes to the memory to be back buffered or the like. The data may have errors or may be a late discard by the transport, controller core. The DMA has four pointers to control the flow, handshaking and size.

At the same time that the transport controller core accesses the data SRAM using the PID of the incoming transport packet and requests that the remainder of the payload of the incoming transport packet from the input module, the transport controller core 32 communicates with the section filter to configure the DMA start address register. The transport controller core 32 writes into the DMA start address register the first address location of where the section in the data payload should be written to the DMA controller if the section is to be retained.

If the result of the CAM operation is a match, then the control logic controls the header register and the section count register load into the section count register from the header register the appropriate byte of the header register which indicates the length of the section. This length may be identified preferably by the number of bytes included therein. Thus the section count register identifies a number of bytes in the section which are to be transferred to the DMA controller. On every data payload section which is, following the transport controller core accessing the appropriate PID in the data SRAM, an input counter counts down the incoming transport packet as it passes through the input register. The input counter is loaded with the value of the number of for example bytes at the incoming transport packet. Every byte which passes through the input register then results in a decrement of the value stored in the input counter by one value. Thus when the value of the input counter reaches zero, the transport controller core identifies such by monitoring the value on line 336 and thus identifies the end of a transport packet. The input counter register 304 in the section filter 312 is connected directly to the output of the input counter 310 and merely mirrors the contents thereof. Thus the input counter register 704 provides a section filter 312 with the register so that it may monitor the value of the input counter to detect the end of a transport packet. The output count register 314 is an upward counter which counts the data payload as it is output through the output register 318. Thus the output counter 314 provides an indication of the DMA address to which the current output byte of the data payload is to be stored relative to a base start address. The output counter 314 is indicative of the offset of the DMA start address to where the current data is to be stored. The output counter 716 of the section filter receives the contents of the output counter 314 on line 330 and thus is a mirror of the contents thereof.

The section comprising the data payload of the transport packet is thus output through the output register to the DMA controller. For each byte of the section which is output, the control logic controls the value in the section count register to be decremented by one value, i.e. in the preferred embodiment by one byte. When the value in the section count register reaches zero, then the section has been successfully parsed and the section filter can cease operation.

In the event, that the packet is not ended, then the control logic will load the next set of bytes entering into the section filter into the header register. The above described operations will then be repeated.

When the end if the incoming packet is reached, the value in the input counter will reach zero and the operate register is reset to indicate an inactive state. Furthermore, the transport controller core 32 itself monitors the state of the operate register and in response to the inactive state being set will identify the end of the section filter operation. In response to the end of the section filter operation, the transport controller core will access the contents of certain registers in the section filter and restore them in the data SRAM with the appropriate PID.

The transport controller core accesses the contents of the header register, section count register, the DMA start address register, section state register and section CRC register of the section filter and stores them in the data SRAM for the data area associated with the PID of the transport packet which is to be parsed. Thus, when a further transport packet arrives, which has the same PID and the continuing section information associated with the first transport packet, the transport controller 32 can reload the values of all of these registers in the section filter and the section filter can recommence parsing of the appropriate section.

A third break point can be defined. The third break point occurs after the payload of an accepted section has been output by the section filter. It happens prior to the input of any bytes of the next section. It also happens after the CRC has been calculated but prior to the reset of the CRC state or the assertion of a new section. If the third break point is configured to happen, the current section is accepted and has been output. The output of additional data that can be required for indexing or any other purposes.

FIG. 8 illustrates how digital television signals 809, 811 and 813 can be transmitted via a cable, satellite or terrestrial television channel 852 and be viewed on a television 890. The first, second and third television signals 809, 811 and 813 each represent the audio and video signals necessary to recreate a television program for input to a television. The digital television signals 809, 811 and 813 are source encoded and channel encoded by a transmitter 850 to produce a modulated analogue signal for transmission on the channel 852. An integrated receiver decoder (also known as a set top box 880) receives the modulated analogue signal from the channel 852 and produces a video signal 839 which operates the television 890.

The operation of the transmitter 850 will now be explained. The transmitter includes a source encoder 810 and a channel encoder 840. The source encoder includes first, second and third MPEG 2 encoders 812, 814 and 816, first, second and third packetisers 818, 820 and 822, first, second and third scramblers 824, 826 and 828 and a multiplexer 830.

First, second and third MPEG-2 encoders respectively receive first 809, second 811 and third 813 television signals and encode the signals to produce first, second and third elementary bit streams 815, 817 and 819. The first 818, second 820 and third 822 packetisers respectively receive first 815, second 817 and third 819 elementary bit streams and packetise the elementary bit streams to produce first, second and third packetised elementary bit streams (PES) 821, 823 and 825. The packetising of an elementary bit stream includes creating series of packets which contain a packet head and a data portion, but which do not have any fixed length. The first, second and third scramblers respectively receive first, second and third packetised elementary bit streams and produce first, second and third scrambled packetised elementary bit streams. Each of the scramblers scrambles only the data portion of each packetised elementary bit stream it receives and does not scramble the packet header.

The multiplexer 830 receives as inputs packetised sections of tables on line 841 and the first, second and third scrambled PES 827, 829 and 831 and produces a transport stream from one of its inputs on line 801 The packetised sections with tables 841 contain information which allows the set top box 880 to effect source decoding and produce the video signals 839. The information is stored in a tabular form where each table contains a number of sections and each section is transmitted individually.

The multiplexer 830 produces the transport stream 801 such as that illustrated in FIG. 1. The transport stream includes a number of transport packets with each transport packet containing a transport header 4 and a transport packet payload 6. Transport packets have a fixed length. In the MPEG-2 digital video broadcast (DVB) standard the transport packet is 188 bytes in length. Transport packets are shorter in length than the packets in the packetised elementary stream. Consequently a packet from the first scrambled PES 827 will be spread over a number of transport packets and these transport packets will be multiplexed with the transport packets derived from the packetised sections in tables 841 and the second and third scrambled PES 829, 831. The transport stream is then supplied on line 801 to the channel encoder 840 to produce the modulated analogue signal for transmission on the channel 852.

The channel encoder 840 includes a circuitry 832 for forward error correcting (FEC) the transport stream on line 801 and a digital to analogue converter for converting the signal from the digital to analogue domain to produce an analogue signal 833. This analogue signal 833 is modulated and up converted to a transmission frequency by the circuitry 834 to produce the modulated analogue signal which is then transmitted into the channel 852 The signal may alternatively be modulated in the digital domain.

The operation of the set top box 880 will now be described. The set top box 880 includes a channel decoder 860 and a source decoder 870. The channel decoder 860 receives a modulated analogue signal on the channel 852 and produces the transport stream 1 which it supplies to the source decoder 870. The channel decoder 860 includes circuitry 862 for tuning to the modulated analogue signal on the channel 852 and for down converting and demodulating the modulated analogue signal on the channel 852 to produce an analogue signal 837. The analogue signal 837 is converted from analogue to digital in an analogue to digital converter and forward error corrected by the circuitry 864 to reproduce the transport stream 1.

The source decoder 870 receives the transport stream 1 and produces the video signal 839. The source decoder 870 includes the programmable transport interface 10 and MPEG-2 decoder 872. The PTI 10 demultiplexes the transport stream 1, selects the transport packets 2 carrying information relating to a particular television program, and descrambles the selected transport packet to produce a data output stream 880, which is in fact the packetised elementary bit stream associated with the selected television program. It should be appreciated that the transport stream may not have been received via a cable or satellite connection and may have been received by the software register 204. The MPEG-2 decoder 872 receives the data output stream 880 and produces the video signal 839 which is supplied to the television 890. The television 890 displays the selected program.

Whilst the third embodiment of the present invention has been described using CAMs, it should be appreciated that in alternative embodiments of the present invention, different memories may be used in order to store the filter and the mask values. In preferred embodiments of the present invention, each of the filter values is provided with a mask value. It should be appreciated that in an alternative embodiment of the present invention, not all of the filter values may be provided with a mask. In a yet further alternative embodiment, none of the filter values may be provided with a mask value. In preferred embodiments of the present invention, two separate CAM arrangements are shown. However, it should be appreciated that it is possible that there are more than two CAMs, for example three or more.

The CAM arrangement described in relation to FIG. 5 has been described in the context of filtering headers of sections. However, it should be appreciated that embodiments of the present invention can be applied to any other suitable type of data which requires filtering.

Having thus described at least one illustrative embodiment of the invention, various alterations, modifications and improvements will readily occur to those skilled in the art. Such alterations, modifications and improvements are intended to be within the spirit and scope of the invention. Accordingly, the foregoing description is by way of example only and is not intended as limiting. The invention is limited only as defined in the following claims and the equivalents thereto.

What is claimed is:

1. Circuitry for processing data, said circuitry comprising:
at least two filter blocks arranged in parallel, each filter block comprising a plurality of filters arranged in parallel;
input circuitry for storing input data, said input data being applied to each of said at least two filter blocks to provide in parallel a first result from a first of said at least two filter blocks and a second result from a second of said at least two filter blocks, wherein each of said at least two filter blocks stores a plurality of filter values, and wherein any result from each filter block is an indication of whether said input data matches any of the plurality of filter values in the filter block; and
a programmable logic block arranged to receive the first result and the second result, and carry out a first Boolean operation with respect to first and second results, wherein the first result is a first operand to the first Boolean operation and the second result is a second operand to the first Boolean operation, and wherein the first Boolean operation applies a first Boolean operator to the first and second operands,
wherein said programmable logic block provides an output indicating whether said input data is required for further processing, and wherein the programmable logic block is capable of being reprogrammed to perform a second Boolean operation with respect to said the first and second results, wherein the first result is a first operand to the second Boolean operation and the second result is a second operand to the second Boolean operation, and wherein the second Boolean operation applies a second Boolean operator, different from the first Boolean operator, to the first and second operands.

2. Circuitry for processing data as claimed in claim 1, wherein at least one of said plurality of filters has associated therewith a mask.

3. Circuitry for processing data as claimed in claim 1, wherein said plurality of filters are provided in a content addressable memory arrangement.

4. Circuitry for processing data as claimed in claim 3, wherein said content addressable memory arrangement comprises a separate content addressable memory for each of said parallel results.

5. Circuitry for processing data as claimed in claim 1, wherein said programmable logic block performs at least one logic operation.

6. Circuitry for processing data as claimed in claim 5, wherein said at least one logic operation is a Boolean operation.

7. Circuitry for processing data as claimed in claim 1, wherein said programmable logic block provides a single result.

8. Circuitry for processing data as claimed in claim 1, wherein mask circuitry is provided for applying a mask to at least one of said at least two parallel results.

9. Circuitry for processing data as claimed in claim 1, wherein said programmable logic block is arranged to carry out said operation with respect of said parallel results in their entirety.

10. Circuitry for processing data as claimed in claim 1, wherein said programmable logic block is arranged to carry out said operation with respect to only one or more of each of said parallel results.

11. Circuitry as claimed in claim 1, wherein said data comprises MPEG data.

12. Circuitry as claimed in claim 11, wherein said data comprises sections of MPEG data.

13. Circuitry as claimed in claim 12, wherein said data comprises headers of sections of MPEG data.

14. Circuitry as claimed in claim 1, wherein said circuitry is provided on an integrated circuit.

15. A method for processing data comprising:
applying input data to at least two blocks of filters in parallel, wherein a first of the at least two blocks of filters provides a first result and a second of the at least two blocks of filter provides, in parallel with the first result, a second result, wherein each of said at least two filter blocks stores a plurality of filter values, and wherein any result from each filter block is an indication of whether said input data matches any of the plurality of filter values in the filter block; and
carrying out a first Boolean operation with respect to said first and second results in a programmable logic block arranged to receive the first and second results from each of said first and second filter blocks, wherein the first result is a first operand to the first Boolean operation and the second result is a second operand to the first Boolean operation, and wherein the first Boolean operation applies a first Boolean operator to the first and second operands,
wherein carrying out an operation provides an output indicating whether said input data is required for further processing, and wherein the programmable logic block is capable of being reprogrammed to perform a second Boolean operation with respect to said first and second results, wherein the first result is a first operand to the second Boolean operation and the second results is a second operand to the second Boolean operation, and wherein the second Boolean operation applies a second Boolean operator, different from the first Boolean operator, to the first and second operands.

16. A method for processing data comprising:
applying input data to a plurality of filters in parallel to provide at least two parallel results comprising a first result and a second result, wherein each of said plurality of filters stores a plurality of filter values, and wherein the result from each filter is an indication of whether said input data matches any of the plurality of filter values in the filter;
carrying out a masking step with respect to the first result to generate a masked first result; and
carrying out a first Boolean operation in a programmable logic block arranged to receive the parallel results after said masking step has been completed, wherein the masked first result is a first operand to the first Boolean operation and the second result is a second operand to the first Boolean operation, and wherein the first Boolean operation applies a first Boolean operator to the first and second operands,
wherein carrying out an operation provides an output indicating whether said input data is required for further processing, wherein the programmable logic block is capable of being reprogrammed to perform a second Boolean operation, wherein the masked first result is a first operand to the second Boolean operation and the second result is a second operand to the second Boolean operation, and wherein the second Boolean operation applies a second Boolean operator, different from the first Boolean operator, to the first and second operands.

17. A method for processing data comprising:
applying input data to a plurality of filters in parallel to provide at least two parallel results comprising a first result and a second result, wherein each of said plurality of filters stores a plurality of filter values, and wherein the result from each filter is an indication of whether said input data matches any of the plurality of filter values in the filter; and
carrying out a first Boolean operation with respect to said first and second results in a programmable logic block arranged to receive the first and second results, wherein the first result is a first operand to the first Boolean operation and the second result is a second operand to the first Boolean operation, and wherein the first Boolean operation applies a first Boolean operator to the first and second operands, wherein the programmable logic block is capable of being reprogrammed to perform a second Boolean operation with respect to said first and second results, wherein the first result is a first operand to the second Boolean operation and the second result is a second operand to the second Boolean operation, and wherein the second Boolean operation applies a second Boolean operator, different from the first Boolean operator, to the first and second operands, and
wherein each of the first and second Boolean operations provides an output indicating whether said input data is required for further processing.

18. Circuitry for processing data, said circuitry comprising:
a plurality of filters arranged in parallel;
input circuitry for storing input data, said input data being applied to said plurality of filters to provide at least two parallel results comprising a first result and a second result, wherein each of said plurality of filters stores a plurality of filter values, and wherein the result from each filter is an indication of whether said input data matches any of the plurality of filter values in the filter;
masking circuitry for applying a mask to the first result to generate a masked first result; and
a programmable logic block arranged to receive the masked first result and the second result and to carry out a first Boolean operation, wherein the masked first result is a first operand to the first Boolean operation and the second result is a second operand to the first Boolean operation, and wherein the first Boolean operation applies a first Boolean operator to the first and second operands,
wherein said programmable logic block provides an output indicating whether said input data is required for further processing, and wherein the programmable logic block is capable of being reprogrammed to perform a second Boolean operation, wherein the masked first result is a first operand to the second Boolean operation and the second result is a second operand to the second Boolean operation, and wherein the second Boolean operation applies a second Boolean operator, different from the first Boolean operator, to the first and second operands.

19. Circuitry for processing data, said circuitry comprising:
a plurality of filters arranged in parallel;
input circuitry for storing input data, said input data being applied to said plurality of filters to provide at least two parallel results comprising a first and second result, wherein each of said plurality of filters stores a plurality of filter values, and wherein the result from each filter is an indication of whether said input data matches any of the plurality of filter values in the filter; and a programmable logic block arranged to receive the first result and the second result and carry out a first Boolean operation with respect to the first and second results, wherein the first result is a first operand to the first Boolean operation and the second result is a second operand to the first Boolean operation, and wherein the first Boolean operation applies a first Boolean operator to the first and second operands, wherein the programmable logic block is capable of being reprogrammed to perform a second Boolean operation with respect to said first and second results, wherein the first result is a first operand to the second Boolean operation and the second result is a second operand to the second Boolean operation, and wherein the second Boolean operation applies a second Boolean operator, different from the first Boolean operator, to the first and second operands; and wherein said programmable logic block provides an output indicating whether said input data is required for further processing.

* * * * *